March 27, 1962 W. C. EAVES 3,027,178
SPLASH GUARD
Filed Aug. 17, 1959
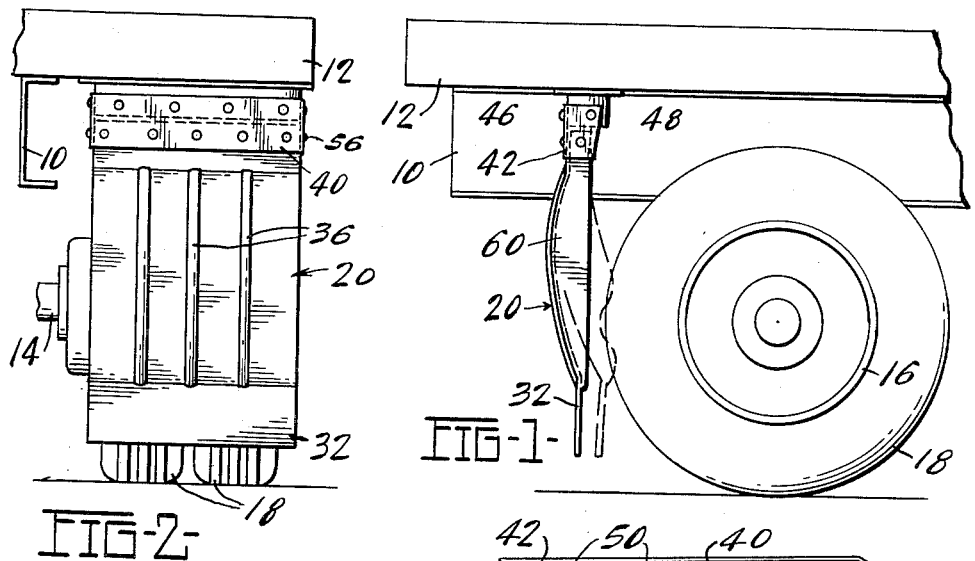
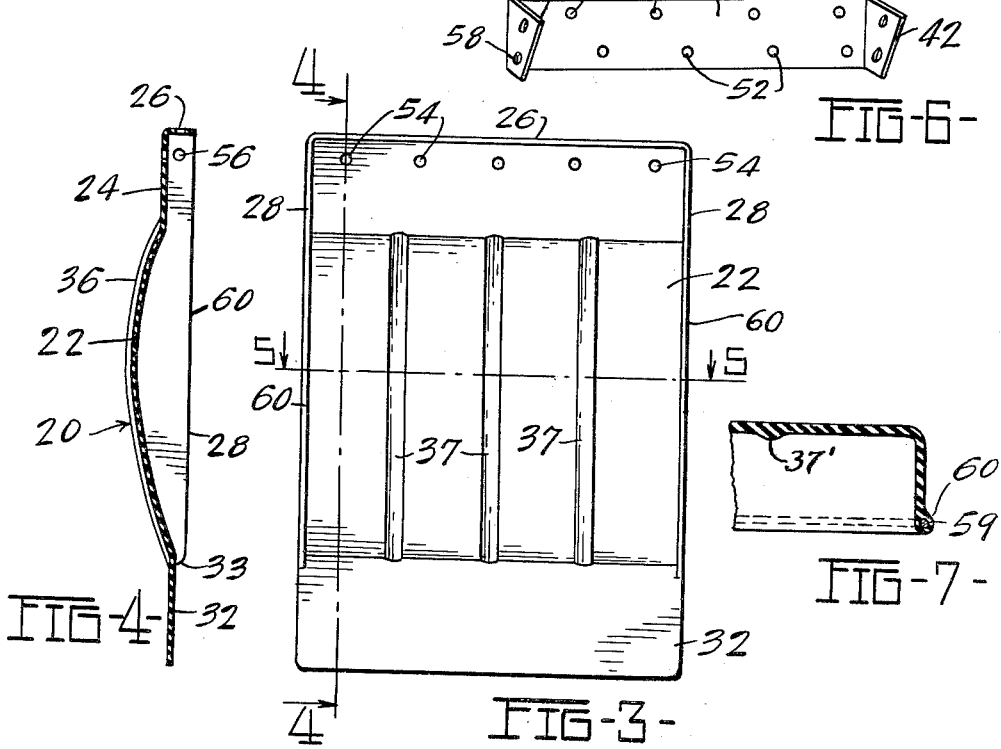
WILLIAM C. EAVES,
INVENTOR
BY
Harry O. Ernsberger
ATTORNEY

United States Patent Office 3,027,178
Patented Mar. 27, 1962

3,027,178
SPLASH GUARD
William C. Eaves, 407 S. Dearborn St., Chicago, Ill.
Filed Aug. 17, 1959, Ser. No. 834,071
6 Claims. (Cl. 280—154.5)

This invention relates to splash guards for vehicles and more particularly to splash guards for use with heavy duty vehicles such as trucks, trailers, tractor-trailer vehicles and the like.

It has heretofore been a usual practice to provide flaps or sheet-like members adjacent the rear wheels of trucks and vehicles of this character, the flaps being fashioned of sheets of comparatively thick rubber which are secured to and depend from the vehicle frame. Flaps or guards of this character have been unsatisfactory for several reasons. They are fashioned of flexible rubber and are suspended at their upper ends and hence have free swinging movements in both directions lengthwise of the vehicle. At high vehicle speeds the sheets or flaps tend to sail rearwardly of the vehicle approaching horizontal positions and hence are only partially effective to prevent rearward movement of foreign matter thrown from the tires of the vehicle. Moreover such flaps are readily subject to being torn or fractured when the vehicle is backed into a loading dock or high curbing due to the flaps being pinched between the tires and the loading dock or curbing.

Flaps of this character do not conform to any curved region adjacent the vehicle tires and hence are ineffective for interrupting laterally directed foreign matter or reduce or eliminate side splash. The flat flap surface, in effect, becomes a deflection medium for foreign matter and increases side splash. Obviously the higher the speed of the vehicle the more important it becomes to effectively prevent rearward projection of foreign matter thrown from the tires. In the use of flat flaps, the higher the vehicle speed, the greater the tendency for the flap to sail toward the rear, thus providing the least protection when it is most needed.

The present invention embraces the provision of a splash guard construction particularly for use on vehicles of the truck or trailer type for effectively intercepting foreign matter thrown rearwardly from the tires of the vehicle wheels and which will not sail rearwardly during forward motion of the vehicle.

An object of the invention is the provision of a molded splash guard construction fashioned of rubber, reinforced rubber or other similar flexible nonmetallic material shaped or configurated to withstand the impact or buffeting of flying stones or other loose objects which may be thrown from the vehicle tires and which will resist the corrosive effect of moisture.

Another object of the invention is the provision of a splash guard of molded construction formed of rubber or rubber-like material shaped or configurated to resist stresses which would tend to deflect the splash guard rearwardly of a vehicle whereby rearward "sail" of the guard is eliminated.

Another object of the invention is the provision of a molded splash guard construction shaped whereby the guard may be flexed forwardly toward the vehicle wheel without damage to the guard in the event that the guard becomes pinched between a loading dock or other object and the vehicle wheel.

Another object of the invention is the provision of a splash guard construction molded to a configuration providing at its lateral edge regions reinforcing webs or flanges to resist rearwardly directed stresses and which, with the central region of the splash guard, forms a pocket or configuration which effectively reduces side splash and lateral deflection of loose objects impinged against the splash guard but does not prevent the splash guard from bending forwardly under pressure.

Another object of the invention is the provision of a molded splash guard of nonmetallic material which may be adequately anchored or secured at the upper region thereof to the vehicle and which requires no additional bracing.

Another object of the invention is the provision of a molded splash guard of nonmetallic material having a curved or contoured center section which is effective to contain the splash from the rear wheels.

Still another object of the invention is the provision of a splash guard construction formed of molded nonmetallic material of one piece or a unit which may be inexpensively constructed and easily installed on all types of trucks or vehicles of this character.

Another object of the invention is the provision of a molded splash guard construction having a curved section and at its lower end region provided with a flexible flat section of short length providing increased flexibility for the lower portion of the guard without impairing its resistance to rearward flexure.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view of the rear portion of a truck-type vehicle equipped with dual wheels, illustrating a form of the invention associated therewith;

FIGURE 2 is a rear elevational view of the construction illustrated in FIGURE 1;

FIGURE 3 is a front elevational view of the splash guard construction of the invention;

FIGURE 4 is a vertical sectional view taken substantially on the line 4—4 of FIGURE 3;

FIGURE 5 is a transverse sectional view taken substantially on the line 5—5 of FIGURE 3;

FIGURE 6 is an isometric view of a form of supporting means for attaching the splash guard to a vehicle, and FIGURE 7 is a fragmentary detail sectional view showing a form of reinforcing means for a portion of the splash guard.

While the form of the invention illustrated herein is associated with or mounted adjacent dual rear wheels of a truck-type vehicle, it is to be understood that the splash guard construction may be utilized with other types of heavy duty vehicles having dual or multiple sets of wheels or may be used with any type of vehicle wherein the invention may be found to have utility.

Referring to the drawings in detail and initially to FIGURES 1 and 2, there is illustrated the rear portion of a frame 10 of a heavy-duty truck-type vehicle which supports a bed or body construction 12 or other load carrying arrangement. The frame is provided with portions (not shown) to which the conventional springs are secured attached to the axles, one of which is illustrated at 14 in FIGURE 2. The vehicle illustrated in FIGURES 1 and 2 is equipped with dual wheels 16, one set of wheels being illustrated in FIGURES 1 and 2, the wheels being equipped with tires 18. It is to be understood that the splash guard arrangement of the invention may be used with vehicles having a single wheel at each side of the vehicle.

A form of splash guard construction or unit of the invention is illustrated in FIGURES 1 through 5 and is fashioned of flexible molded rubber or other suitable rubber-like material such as a moldable plastic. If desired, the molded construction may be reinforced by fabric or other fibrous material embedded in the molded rubber.

The splash guard construction includes a body or member having a central curved or arcuately shaped portion or section 22 of a desired width for use with dual wheels. Integrally joined with the central curved section 22 is an upwardly extending planar portion 24 at the upper region of the unit which terminates in a forwardly extending flange 26. Formed at or bounding the edge regions of the curved section 22 are forwardly extending flanges or sides 28 integrally molded with the central section 22 and the portions 24 and 26. The side flanges 28 form stress portions or struts for purposes hereinafter explained.

Formed integrally at the lower extremity of the curved central section 22 is a depending flap 32 of planar shape, the side flanges 28 terminating at a region 33 whereby the flap 32 may be readily flexed in the event that the flap is struck by stones thrown from the vehicle wheels minimizing liability of fracture or damage to the flap portion 32.

Extending vertically through the central curved section 22 is a plurality of laterally spaced substantially parallel ridges 36 formed by recesses 37, the material at this region being of substantially the same thickness as the major area of the central section 22. The ridges 36 provide for increased strength in the curved central section. If desired, the ridges may be continued into flap portion 32 of the splash guard.

The lengthwise reinforcing ribs may be in the form of ridges 37' of the character shown in FIGURE 7, which extend interiorly of the molded body, the rubber of the ridges being thicker than the adjacent regions of the body. Such thickened regions may be embodied in the construction with or without the metal reinforcement 60.

The splash guard 20 is adapted to be secured or attached to the frame or body construction of the vehicle by suitable means. As illustrated in FIGURES 1, 2 and 6 a bracket or attachment member 40 extends contiguously with the planar portion 24 and is formed with forwardly projecting flanges 42 which are of a dimension to embrace the flanges 28 of the splash guard unit. Secured to the vehicle member 12 or other frame component is a transversely extending bracket 46 having a horizontally arranged portion 48 which is adapted to be secured to the flange 26 by suitable bolts or rivets projecting through openings in the bracket and in the flange 26.

Secured to the bracket 46 and to the portion 24 of the molded splash guard unit is the bracket 40 shown in FIGURE 6. The central portion of the bracket 40 is provided with openings 50 which are aligned with openings formed in the frame bracket 46 to accommodate securing rivets or bolts. The bracket 40 is provided with a second series of openings 52 which register with aligned openings 54 formed in the portion 24 of the splash guard unit and receives bolts or other securing means for attaching the unit to the bracket 40.

A reinforcing plate (not shown) may be disposed on the interior surface of the portion 24 and the rivets extended through openings in such plate. The upper portions of the side flanges 28 are provided with openings 56 which register with openings 58 in the flange portions 42 formed on bracket 40 to attach the side flanges 28 to the bracket 40.

If desired, the U-shaped metal member 40 or similar attaching member may be molded in the rubber of the splash guard body and thus embedded in the body.

It will be noted from FIGURE 1 that the splash guard unit 20 depends from the frame structure of the vehicle at a region adjacent and rearwardly of the dual wheels 18. As the flanges 28 are on the forward regions of the unit, the flanges 28 function or serve to prevent movement of the splash guard unit in a rearward direction. Any tendency of the unit to "sail" in a rearward direction when the vehicle is moving forwardly is resisted by the flanges 28 so that the splash guard is maintained in an effective position irrespective of the speed of the vehicle. If desired, the side flanges of the splash guard construction may be provided with an enlarged bead 59 formed on the forward edge regions of the flanges as shown in FIGURE 7. If additional reinforcement is desired, a flexible metal cable or flexible wire 60 may be embedded in the bead construction 59.

It will be seen that the curved central section 22 in conjunction with the side flanges 28 form a pocket which tends to prevent side splash from the vehicle wheels and, together with the depending flap 32, provides an effective means for impeding rearward projection of water or stones thrown from the vehicle wheels.

The position of the splash guard indicated in broken lines in FIGURE 1 illustrates the condition in the event that the vehicle is backed into a loading dock or curb and the splash guard pinched between the loading dock and the rear wheels. The side flanges are merely slightly buckled or rippled and no damage occurs to the splash guard.

Another feature of the splash guard construction of the invention is that it may be readily flexed forwardly to an extent that it may be rolled up adjacent the frame above and out of the path of the rear wheels. This feature is particularly advantageously on installations of the splash guard construction on dump trucks, cement mixers and such vehicles which are subject to off-the-highway activities where it becomes desirable to roll the splash guard out of its operative position. This may be accomplished by rolling the guard adjacent the frame and securing the same in rolled or compacted condition by a a chain or other securing means (not shown) looped around the rolled guard and hooked or engaged with the vehicle body or frame.

From the foregoing, it will be seen that the splash guard construction, molded of rubber, synthetic rubber, plastic or other nonmetallic material is especially configured or shaped to prevent rearward "sailing" or rearward movement of the guard with respect to the vehicle wheels and thus effectively impede objects or water thrown rearwardly from the wheels, yet providing a guard which is flexible in the forward direction to secure the numerous advantages herein pointed out. It is to be understood that other forms of means for attaching the splash guard construction to a vehicle may be employed, the important factor in this respect being that the attachment means be secured to the upper region of the splash guard in a manner to prevent hinging action of the splash guard at the region of its fastening or attachment means.

It is apparent that, within the scope of the invention, modifications and different arrangements may be made other than as herein disclosed, and the present disclosure is illustrative merely, the invention comprehending all variations thereof.

I claim:

1. A splash guard for a vehicle comprising a body of flexible rubber-like material having a curved central section, said curved section being bounded at its lateral regions by forwardly extending flanges integral with the curved section, a flap portion depending from the curved section, and an attachment portion integrally joined with the curved section at the upper region thereof and with the forwardly extending flanges and adapted to be connected with means for securing the splash guard to the vehicle.

2. A splash guard for a vehicle comprising a body molded of flexible rubber-like material having a curved central section, said curved section being formed with spaced raised portions and being bounded at its lateral regions by forwardly extending flanges, a flap portion depending from the curved section, a planar portion integrally joined with the curved section at the upper region thereof and with the forwardly extending flanges and adapted to be connected with means for securing the splash guard to the vehicle.

3. A splash guard construction for a vehicle comprising a molded body of flexible rubber-like material having a curved central section, said body being provided at the sides of the central section with forwardly extending flanges of substantial depth integrally formed with the central section, a flap portion integrally formed with and depending from the curved central section, an attachment portion integrally joined with the central section, said side flanges being joined integrally with the attachment portion, a sheet metal member having a central portion extending coincident with the attachment portion of the body, said metal member having flange portions extending coincident with the forwardly extending flanges formed on the body, said metal member being secured to the attachment portion and the flanges of the body.

4. A splash guard construction for a vehicle comprising a molded body of flexible rubber-like material having a curved central section, said body being provided at the sides of the central section with forwardly extending flanges of substantial depth integrally formed with the central section, a flap portion integrally formed with and depending from the curved central section, an attachment portion integrally formed with the central section, said side flanges being integrally joined with the attachment portion, a metal member having a central portion extending coincident with the attachment portion of the body, said metal member having forwardly extending flange portions extending coincident with the forwardly extending flanges formed on the body, said metal member and the attachment portion being formed with registering openings adapted to receive means extending through the registering openings to secure the body to the metal member, said metal member providing mounting means for securing the splash guard construction on a vehicle.

5. A splash guard construction for a vehicle comprising a molded body of flexible nonmetallic material having a curved central section, said body being provided at the sides of the central section with forwardly extending flanges of substantial depth integrally molded with the central section, said central section having spaced linear raised portions for reinforcing the central section, a flap portion integrally formed with and depending from the central section, an attachment portion integrally formed with and extending upwardly from the central section, the said forwardly extending flanges being joined integrally with the upwardly extending attachment portion, a sheet metal member having a central section coincident with the attachment portion and forwardly extending flanges arranged coincident with the forwardly extending flanges formed at the sides of the attachment portion and central section, said metal member and said attachment portion being secured together, and a flexible metallic reinforcement embedded in the forward edge regions of the side flanges of the splash guard construction.

6. A splash guard construction for a vehicle comprising a body formed of flexible rubber-like material and having a central curved section, forwardly extending flanges arranged at the sides of the curved section and integrally formed therewith, a flap portion depending from the curved section, said body being formed with an attachment portion integrally joined with the curved section, and a sheet metal member having a central portion coincident with the attachment portion and forwardly extending flanges coincident with the forwardly extending flanges formed on the body, said metal member being secured to the attachment portion and the upper regions of the forwardly extending flanges of the body.

References Cited in the file of this patent

UNITED STATES PATENTS

| | | |
|---|---|---|
| 1,914,977 | Persons et al. | June 20, 1933 |
| 2,461,044 | Ely | Feb. 8, 1949 |
| 2,619,363 | Wenham et al. | Nov. 25, 1952 |
| 2,699,955 | Eaves et al. | Jan. 18, 1955 |
| 2,714,015 | Sherman | July 26, 1955 |
| 2,831,702 | Eaves et al. | Apr. 22, 1958 |